(12) United States Patent
Loucka et al.

(10) Patent No.: US 6,235,106 B1
(45) Date of Patent: May 22, 2001

(54) BLUE SHADE FE-CR BLACK

(75) Inventors: William Gerald Loucka, Fairview Park; Mark Edward Gall, South Euclid; Jerome David Thomas, Eastlake, all of OH (US)

(73) Assignee: Engelhard Corporation, Iselin, NJ (US)

(*) Notice: Subject to any disclaimer, the term of this patent is extended or adjusted under 35 U.S.C. 154(b) by 0 days.

(21) Appl. No.: 09/672,249

(22) Filed: Sep. 28, 2000

(51) Int. Cl.⁷ .................. C09C 1/24; C09C 1/34
(52) U.S. Cl. ............. 106/453; 106/170.58; 106/198.1; 106/459; 524/407; 423/594
(58) Field of Search ................ 106/453, 459, 106/170.58, 198.1; 524/407; 423/594

(56) References Cited

U.S. PATENT DOCUMENTS

| | | | |
|---|---|---|---|
| 3,615,810 | 10/1971 | Krefeld et al. | 106/304 |
| 4,205,996 | 6/1980 | Eppler | 106/302 |
| 4,921,542 | 5/1990 | Rademachers et al. | 106/456 |
| 4,966,641 | 10/1990 | Westernaus et al. | 106/456 |
| 5,002,609 | 3/1991 | Rademachers et al. | 106/456 |
| 5,250,112 | 10/1993 | Wussow et al. | 106/453 |
| 5,269,841 | 12/1993 | Kuske et al. | 106/456 |
| 5,718,755 | 2/1998 | Kohler et al. | 106/456 |

FOREIGN PATENT DOCUMENTS

| | | | |
|---|---|---|---|
| 53-81536 | * | 7/1978 | (JP). |
| 10-273537 | * | 10/1998 | (JP). |
| 1393810 | * | 5/1988 | (SU). |
| 1551713 | * | 3/1990 | (SU). |

* cited by examiner

*Primary Examiner*—Anthony Green
(74) *Attorney, Agent, or Firm*—Raymond F. Keller

(57) ABSTRACT

One aspect of the invention relates to a blue shade black pigment composition, containing at least iron oxide, chrome oxide, wherein the ratio of iron to chromium is from about 1:1 to about 5:1 by weight; and manganese oxide. Another aspect of the invention relates to a method of making a blue shade black pigment involving combining iron oxide, chrome oxide, and manganese oxide to form a mixture; heating the mixture to a temperature from about 700° C. to about 1,300° C. for a time from about 1 to about 5 hours; and optionally agitating the heated mixture to provide the blue shade black pigment. Yet another aspect of the invention relates to a plastic composition containing a plastic material and a blue shade black pigment composition containing at least iron oxide, chrome oxide, and manganese oxide.

25 Claims, 1 Drawing Sheet

BLUE SHADE FE-CR BLACK

FIELD OF THE INVENTION

The present invention generally relates to various aspects related to blue shade black pigments containing iron and chromium. In particular, the present invention relates to blue shade black pigments having desirable weathering characteristics, methods of making the blue shade black pigments, plastics and other materials containing the blue shade black pigments, and methods of using the blue shade black pigments.

BACKGROUND OF THE INVENTION

Iron oxide is often used with other components to make black Complex Inorganic Color Pigments (CICP). A CICP is a pigment made by heating a number of different metal oxides. Relatively large, coarse, and/or hard particles often lead to problems in some CICP applications.

The large, coarse, and/or hard CICP particles may be employed in substances such as concrete. However, CICP particles used for coloring coatings, plastics, lacquers and synthetic resins are typically subjected to intensive grinding. The disadvantages associated with intensive grinding include the undesirable formation dust, difficulties in measuring the ground CICP particles, and difficulties in dispensing with the ground CICP particles.

Moreover, in order for CICP particles used for coloring coatings, plastics, lacquers and synthetic resins, high temperature stability is required since these materials are often processed or exposed to high temperatures. As a result, black pigments based upon $Fe_3O_4$ cannot be used for coloring coatings, plastics, lacquers and synthetic resins. This is because $Fe_3O_4$ is oxidized to brown or red $Fe_2O_3$ at high temperatures, such as above 180° C.

Most black CICP formulations have one or two desirable properties as well as several undesirable properties. For example, some black pigments are strong, but have poor weathering characteristics, poor heat resistance, undesirable brown, red and/or yellow shades, and/or costly starting materials. Specifically, PBK 30 is strongly black, but is expensive since it contains nickel. PBK 30 also has improvable weathering characteristics.

Given these circumstances, when employing a black CICP formulation, one must accept a compromise on at least one desirable property. There is thus an unmet need in the art for a black CICP formulation having many desirable properties.

SUMMARY OF THE INVENTION

The present invention provides black CICP formulations that possess high pigment strength, good weathering characteristics, high temperature resistance, and a blue shade. The black CICP formulations of the present invention possess many desirable characteristics thus minimizing the compromises typically required when selecting a black pigment.

One aspect of the invention relates to a blue shade black pigment composition, containing at least iron oxide, chrome oxide, wherein the ratio of iron to chromium is from about 1:1 to about 5:1 by weight; and manganese oxide.

Another aspect of the invention relates to a method of making a blue shade black pigment involving combining iron oxide, chrome oxide, and manganese oxide to form a mixture; heating the mixture to a temperature from about 700° C. to about 1,300° C. for a time from about 1 to about 5 hours; and optionally agitating the heated mixture to provide the blue shade black pigment.

Yet another aspect of the invention relates to a plastic composition containing a plastic material and a blue shade black pigment composition containing at least iron oxide, chrome oxide, and manganese oxide.

DETAILED DESCRIPTION OF THE INVENTION

Figure 1:
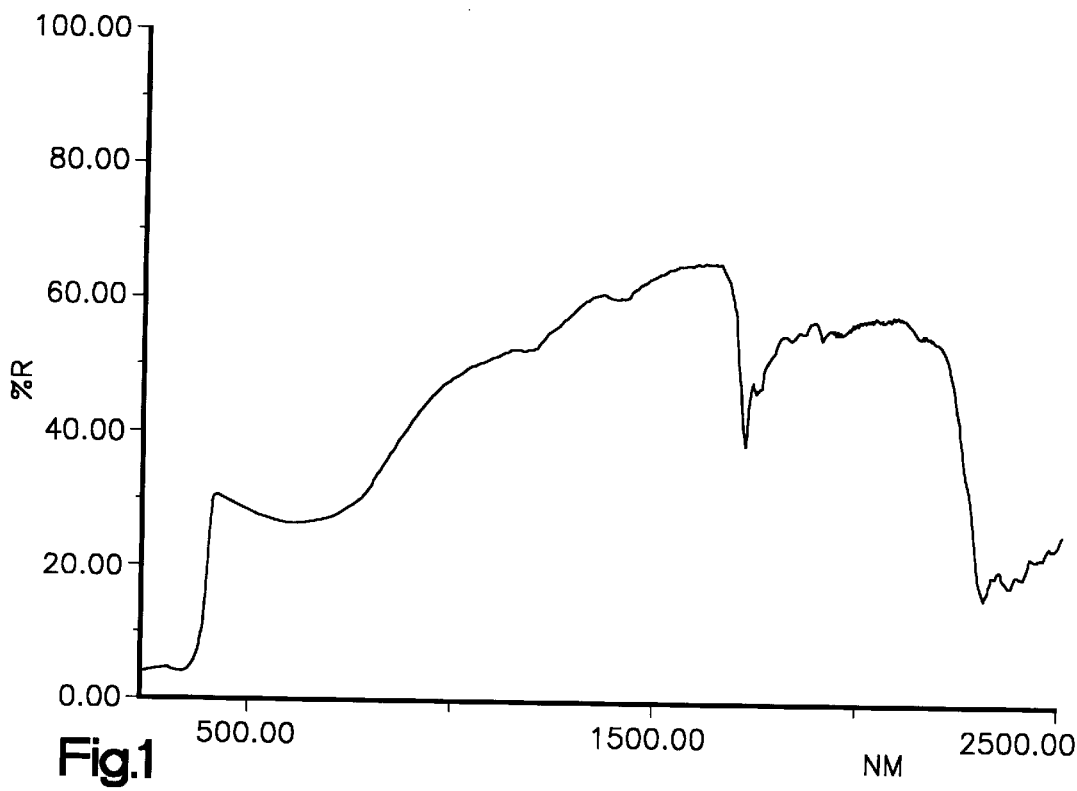
FIG. 1 shows an IR reflectance curve for a conventional PBK 30 pigment.

The present invention provides blue shade black iron-chromium pigments that possess at least one of high pigment strength, good weathering characteristics, high temperature resistance, stable during handling, stable to oxidation, and highly dispersible.

The blue shade black iron-chromium pigments contain at least three components; namely, iron oxide, chrome oxide, and manganese oxide. The blue shade black iron-chromium pigments optionally contain other components such as a mineralizer. The iron oxide and chrome oxide form a crystal structure typically represented by the formula $[Fe,Cr]_2O_3$, corresponding to a PBR 29 pigment, wherein the crystal structure contains more iron than chromium. PBR 29 pigments generally have a brown hue, or a brown shade black hue. However, the iron-chromium pigments of the present invention unexpectedly have a desirable blue shade black hue.

The iron oxide of the blue shade black iron-chromium pigments contributes to the strength of the pigment. Iron oxide primarily contains yellow iron oxide; that is, $Fe_2O_3.H_2O$ or FeOOH (hydrated iron (III) oxide). Forms of yellow iron oxide include α-FeOOH and γ-FeOOH. Other forms of iron oxide, which may be used in addition to yellow iron oxide include $Fe_3O_4$ (iron (II, III) oxide) also known as $FeO.Fe_2O_3$, $Fe_2O_3$ (iron (III) oxide including α-$Fe_2O_3$ and/or γ-$Fe_2O_3$), $Fe(OH)_2$, and $Fe(OH)_3$. Iron oxides are commercially available and/or may be made from iron oxide precursors.

Although not necessary, it is preferred to employ iron oxide or iron oxide precursors having a relatively small particle size. For example, iron oxide having an average particle size (by weight) of about 5 μm or less is employed. In another embodiment, iron oxide having an average particle size (by weight) of about 1 μm or less is employed.

In one embodiment, the blue shade black iron-chromium pigments of the present invention contain from about 40% to about 90% by weight of iron oxide. In another embodiment, the blue shade black iron-chromium pigment contains from about 45% to about 80% by weight of iron oxide. In yet another embodiment, the blue shade black iron-chromium pigment contains from about 50% to about 75% by weight of iron oxide.

The chrome oxide of the blue shade black iron-chromium pigments contributes to the strength of the pigment. Chrome oxide primarily contains $Cr_2O_3$ (chromium (III) oxide), but may also contain chromium (VI) oxide. Chrome oxide is commercially available and/or may be made from chrome oxide precursors. Chrome oxide precursors include chromium acetate, chromium bromide, chromium chloride, chromium fluoride, chromium nitrate, and chromium sulfate.

Although not necessary, it is preferred to employ chrome oxide or chrome oxide precursors having a relatively small particle size. For example, chrome oxide having an average particle size (by weight) of about 5 μm or less is employed. In another embodiment, chrome oxide having an average particle size (by weight) of about 2 μm or less is employed.

In one embodiment, the blue shade black iron-chromium pigments of the present invention contain from about 10% to about 60% by weight of chrome oxide. In another embodiment, the blue shade black iron-chromium pigment contains from about 20% to about 55% by weight of chrome oxide. In yet another embodiment, the blue shade black iron-chromium pigment contains from about 25% to about 50% by weight of chrome oxide.

In some instances, the ratio of iron to chromium in the resultant pigment falls within a suitable range for maximizing color strength and/or maintaining crystal structure indicative of a PBR 29 pigment. This crystal structure is represented by the formula $[Fe,Cr]_2O_3$. This structure is determined/confirmed using X-ray diffraction. In this connection, in one embodiment, the ratio of iron to chromium is from about 1:1 to about 5:1 by weight (which also corresponds to the amounts of iron oxide and chrome oxide initially combined). In another embodiment, the ratio of iron to chromium is from about 1.5:1 to about 4:1 by weight. In yet another embodiment, the ratio of iron to chromium is from about 2:1 to about 3.5:1 by weight. In most embodiments, there is more iron in the blue shade black iron-chromium pigments than chromium.

The PBR 29 pigment of the present invention has a crystal structure that is different from the crystal structure of PBR 35 pigments, which have a spinel structure. PBR 35 pigments have a structure represented by the formula $FeCr_2O_4$ or $FeO.Cr_2O_3$. Spinel structures have the general formula $AB_2O_4$. The PBR 29 type pigment of the present invention does not have a spinel structure. The PBR 29 pigment of the present invention has a crystal structure that is different from the crystal structure of PG 17 pigments, which have a hematite structure. PG 17 pigments have a structure represented by the formula $Cr_2O_3$. The PBR 29 type pigment of the present invention does not have a hematite structure.

The manganese oxide of the blue shade black iron-chromium pigments contributes to the strength and blueness of the pigment. Manganese dioxide primarily contains manganese dioxide ($MnO_2$). Manganese oxide may also contain manganic oxide ($Mn_2O_3$), manganous oxide (MnO), MnOOH, and $Mn_3O_4$. Manganese oxides are commercially available and/or may be made from manganese oxide precursors. Manganese oxide precursors include manganese acetate, manganese bromide, manganese carbonate, manganese chloride, manganese fluoride, manganese iodide, manganese nitrate, and manganese sulfate. Even though manganese oxide is incorporated into the blue shade black iron-chromium pigments of the present invention, a spinel structure and/or a hematite structure are not obtained.

Although not necessary, it is preferred to employ manganese oxide or manganese oxide precursors having a relatively small particle size. For example, manganese oxide having an average particle size (by weight) of about 5 μm or less is employed.

In one embodiment, the blue shade black iron-chromium pigments of the present invention contain from about 0.1% to about 20% by weight of manganese oxide. In another embodiment, the blue shade black iron-chromium pigment contains from about 0.5% to about 10% by weight of manganese oxide. In yet another embodiment, the blue shade black iron-chromium pigment contains from about 1% to about 5% by weight of manganese oxide.

The optional mineralizer of the blue shade black iron-chromium pigments may contribute to the strength of the pigment, induce minor color changes in the pigment, and/or reduce the heating temperature required to make the pigment. Mineralizers include metal fluorides, metal chlorides, and metal sulfates. Specific examples of mineralizers include $BaF_2$, $SrF_2$, $CaF_2$, $MgF_2$, NaF, KCl, KF, $NH_4Cl$, $BaCl_2$, $SrCl_2$, $CaCl_2$, $MgCl_2$, NaCl, $BaSO_4$, $SrSO_4$, $CaSO_4$, $Na_2SO_4$, and $MgSO_4$, $MoO_3$, and the like. These compounds are commercially available and/or may be made using methods known in the art.

In one embodiment, the blue shade black iron-chromium pigments of the present invention optionally contain from about 0.01% to about 10% by weight of a mineralizer. In another embodiment, the blue shade black iron-chromium pigment optionally contains from about 0.1% to about 5% by weight of a mineralizer. In yet another embodiment, the blue shade black iron-chromium pigment optionally contains from about 0.5% to about 2% by weight of a mineralizer. In still yet another embodiment, the blue shade black iron-chromium pigment consists essentially of iron oxide, chrome oxide, manganese oxide and optionally a mineralizer such as barium fluoride.

In some instances, the ratio of iron oxide to mineralizer such as barium fluoride falls within a suitable range for maximizing color strength. In this connection, in one embodiment, the ratio of iron oxide to the mineralizer is from about 10:1 to about 70:1 by weight. In another embodiment, the ratio of iron oxide to the mineralizer is from about 30:1 to about 50:1 by weight.

The blue shade black iron-chromium pigments of the present invention may further optionally contain at least one inorganic material. Such inorganic materials include titanium dioxide, silicon dioxide, boron oxide, and salts such as sodium chloride or other alkali metal salts. When present, these supplemental inorganic materials are present from about 0.01% to about 10% by weight.

In one embodiment, the blue shade black iron-chromium pigments of the present invention do not contain cobalt. In another embodiment, the blue shade black iron-chromium pigment consists essentially of iron oxide, chrome oxide, and manganese oxide. In yet another embodiment, the blue shade black iron-chromium pigments of the present invention do not contain nickel.

In one embodiment, the blue shade black iron-chromium pigments of the present invention further contain at least one of a binder and a dispersant. In such embodiments, the binder and/or dispersant are present in an amount from about 0.01% to about 2% by weight. In another embodiment, the blue shade black iron-chromium pigments of the present invention do not contain a binder and/or a dispersant (a dispersant-free pigment, a binder-free pigment, or a dispersant/binder-free pigment).

Generally speaking, the blue shade black iron-chromium pigments of the present invention are made by combining the three required components and one or more optional ingredients to form a mixture, heating the mixture, and reducing the particle size of the resultant powder, if necessary, for a given end use.

Optionally, after combining at least the iron oxide, chrome oxide, manganese oxide, and one or more optional ingredients to form a mixture, the mixture is blended. Blending or mixing is conducted by any suitable means including using a blender, using a Waring mixer, and the like. Blending promotes the formation of a uniform mixture.

The mixture of components is then heated to form a solid solution in the form of a powder. In a preferred embodiment, the mixture of components is heated to a calcination temperature to form the solid solution of a powder. The atmosphere during heating is typically air, but an oxygen rich (containing more than about 21% by weight oxygen) atmosphere, or an inert gas atmosphere may also be employed. Inert gases include nitrogen, helium, neon, argon, and xenon.

During heating, the blue shade black pigment is initially formed and substantially all of the oxide precursors, if present, are converted to their corresponding oxides. The Loss-on-Ignition (LOI) is a measure of the relative amount of a substance which is converted to its corresponding oxide during calcination. The LOI of the CICP formulations according to the present invention are typically from about 1% to about 20% by weight. In another embodiment, the LOI of the CICP formulations according to the present invention are typically from about 2% to about 15% by weight.

Heating is performed using any suitable apparatus known in the art such as a rotary kiln, tunnel kiln, rotary calciner, vertical calciner, high temperature cyclone, and the like. The temperature for heating is generally from about 700° C. to about 1,300° C. In another embodiment, the calcination temperature is from about 800° C. to about 1,100° C. In yet another embodiment, the calcination temperature is from about 850° C. to about 1,050° C. The mixture is heated for a sufficient period of time at the calcination temperature to form a solid solution. In one embodiment, the mixture is heated from about 1 to about 5 hours at the calcination temperature. In another embodiment, the formulation is heated from about 2 to about 4 hours at the calcination temperature.

In one embodiment, the mixture is placed in a suitable heating apparatus that is at the calcination temperature. In another embodiment, the mixture is placed in a suitable heating apparatus and the temperature is increased (ramped) to the calcination temperature. In this embodiment, the temperature is increased to the calcination temperature over a period of time from about 1 to about 10 hours.

The resultant CICP composition, which is typically in powdered form, may be optionally processed to reduce particle sizes or particle size ranges to more useful sizes or more useful size ranges. Any suitable apparatus normally used for the mechanical agitation of solid materials may be utilized including pulverizers, grinders, mixers, rotating cylinders, tumbling barrels, ball mills, hammer mills, jet mills, roller mills, disc mills, and the like. In many instances, application of shear mixing or jet milling is sufficient to disperse and/or reduce particle sizes. In other instances, pulverizing the heat treated composition is sufficient to disperse and/or reduce particle sizes.

The resultant blue shade black CICP composition contains particles having an average size (by volume) from about 0.01 microns to about 3 microns. In another embodiment, the blue shade black CICP composition contains particles having an average size from about 0.1 microns to about 2 microns. In yet another embodiment, the blue shade black CICP composition contains particles having an average size from about 0.25 microns to about 1 micron.

In one embodiment, resultant blue shade black CICP composition contains particles having a substantially spherical shape of the particles, flow characteristics are markedly improved compared to conventional black pigment compositions. As a result of the substantially spherical shape of the particles, the particles tend not to agglomerate or aggregate. Decreased agglomeration and/or aggregation leads to reduced residue levels.

The resultant blue shade black iron-chromium pigments of the present invention have a high absorption capacity for visible light. This is confirmed by the lightness/darkness value, commonly represented by $L^*$. The lightness/darkness value is determined by combining 1.5 g of the pigment with 10 g of titanium dioxide, and incorporating the combination into 100 g of rigid polyvinyl chloride to form a plaque, and testing the plaque. Many commercially available black pigments have $L^*$ values in the upper 50s and lower 60s, such as from 58 to 62. In one embodiment, the blue shade black iron-chromium pigments of the present invention have $L^*$ values of about 56 or less. In another embodiment, the blue shade black iron-chromium pigments have $L^*$ values of about 55 or less. In yet another embodiment, the blue shade black iron-chromium pigments have $L^*$ values of about 54 or less.

The resultant blue shade black iron-chromium pigments of the present invention have a blue shade. Blue shade is commonly measured by $b^*$ values, wherein a positive value indicates a brown tinge and a negative value indicates a blue tinge. The blue shade is determined by combining 1.5 g of the pigment with 10 g of titanium dioxide, and incorporating the combination into 100 g of rigid polyvinyl chloride to form a plaque, and testing the plaque. In one embodiment, the blue shade black iron-chromium pigments of the present invention have $b^*$ values of about $-1$ or less (less meaning more negative, in that $-1.5$ is less than $-1$). In another embodiment, the blue shade black iron-chromium pigments have $b^*$ values of about $-2$ or less. In yet another embodiment, the blue shade black iron-chromium pigments have $b^*$ values of about $-2.5$ or less.

The blue shade black CICP compositions according to the present invention can be incorporated into any material requiring color. Examples of materials in which blue shade black CICP compositions may be incorporated include paints, coatings, inks, tapes, plastics, fibers, ceramics, concrete, mortars, and the like. Specific examples of inks include printing inks and lacquers, and specific examples of plastics include thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride, polyvinyl fluoride, polyvinyl acetal, polyvinyl alcohol, and polyvinyl acetate, polyesters and rubber, and also filaments made of viscose and cellulose ethers, cellulose esters, polyamides, polycarbonates, polyurethanes, polyesters, for example polyglycol terephthalates, and polyacrylonitrile.

See, for example, with regard to ink: R. H. Leach, editor, *The Printing Ink Manual,* Fourth Edition, Van Nostrand Reinhold (International) Co. Ltd., London (1988), particularly pages 282–591; with regard to paints: C. H. Hare, *Protective Coatings,* Technology Publishing Co., Pittsburgh (1994), particularly pages 63–288; and with regard to plastics: T. G. Webber, *Coloring of Plastics,* John Wiley & Sons, New York (1979), particularly pages 79–204. The foregoing references are hereby incorporated by reference herein for their teachings of ink, paint and plastic compositions, formulations and vehicles in which the blue shade black CICP compositions of this invention may be used including amounts of colorants.

Especially when incorporated in film or fiber forming materials, such as paints, coatings, and plastics, the blue shade black CICP compositions according to the present invention display strong and bright black color while not degrading the integrity and uniformity of the resultant films, fibers, and plastics. The blue shade black CICP compositions not degrading the integrity and uniformity of the resultant films, fibers and plastics which can be as thin as about 3 mils, and even about 2 mils.

When incorporated into plastics, especially polyvinyl compounds and polyolefins, the blue shade black CICP compositions according to the present invention not only display strong and bright black color, but also exhibit excellent weathering characteristics. As a result, plastics containing the blue shade black CICP compositions may be advantageously employed in outdoor uses or other harsh environments.

The following examples illustrate the present invention. Unless otherwise indicated in the following examples and elsewhere in the specification and claims, all parts and percentages are by weight, all temperatures are in degrees Centigrade, and pressure is at or near atmospheric pressure.

EXAMPLE 1

18 g of chrome oxide, 26 g of yellow iron oxide, 0.45 g of barium fluoride, and 1.5 g of manganese dioxide are combined and blended to form a uniform mixture. The mixture is then heated at a temperature of 1,050° C. for 3 hours. After calcination, the mixture is jet milled to provide a blue shade black pigment.

EXAMPLE 2

18 g of chrome oxide, 29 g of yellow iron oxide, 0.25 g of barium fluoride, and 1.5 g of manganese dioxide are combined and blended to form a uniform mixture. The mixture is then heated at a temperature of 1,050° C. for 3 hours. After calcination, the mixture is jet milled to provide a blue shade black pigment.

EXAMPLE 3

18 g of chrome oxide, 29 g of yellow iron oxide, 0.45 g of barium fluoride, and 1.5 g of manganese dioxide are combined and blended to form a uniform mixture. The mixture is then heated at a temperature of 1,050° C. for 3 hours. After calcination, the mixture is jet milled to provide a blue shade black pigment.

EXAMPLE 4

18 g of chrome oxide, 29 g of yellow iron oxide, 0.25 g of barium fluoride, and 1.5 g of manganese dioxide are combined and blended to form a uniform mixture. The mixture is then heated at a temperature of 1,050° C. for 3 hours. After calcination, the mixture is jet milled to provide a blue shade black pigment.

EXAMPLE 5

18 g of chrome oxide, 31 g of yellow iron oxide, 0.45 g of barium fluoride, and 1.5 g of manganese dioxide are combined and blended to form a uniform mixture. The mixture is then heated at a temperature of 1,050° C. for 3 hours. After calcination, the mixture is jet milled to provide a blue shade black pigment.

EXAMPLE 6

198 g of chrome oxide, 319 g of yellow iron oxide, 4.95 g of barium fluoride, and 16.5 g of manganese dioxide are combined and blended to form a uniform mixture. The mixture is then heated at a temperature of 1,050° C. for 3 hours. After calcination, the mixture is jet milled to provide a blue shade black pigment.

EXAMPLE 7

24.7 g of chrome oxide, 72.2 g of yellow iron oxide, and 3.1 g of manganese dioxide are combined and blended to form a uniform mixture. The mixture is then heated at a temperature of 970° C. for 3.5 hours. After calcination, the mixture is pulverized to provide a blue shade black pigment.

The infrared (IR) reflectance curve is an indication/predictor of the weathering characteristics of a plastic containing a given pigment. The IR reflectance curves of two black pigments, one pigment according to the present invention and one conventional pigment. The pigment according to the present invention is made in accordance with Example 6. The conventional black pigment is identified as PBK 30, containing iron, chromium, nickel, and manganese components.

The IR reflectance curves are generated by combining 1.5 g of the pigment with 10 g of titanium dioxide. The combination is incorporated into 100 g of rigid polyvinyl chloride to form a plaque. The plaque is then irradiated with light and the reflectance is measured as a function of wavelength.

Figure 2:
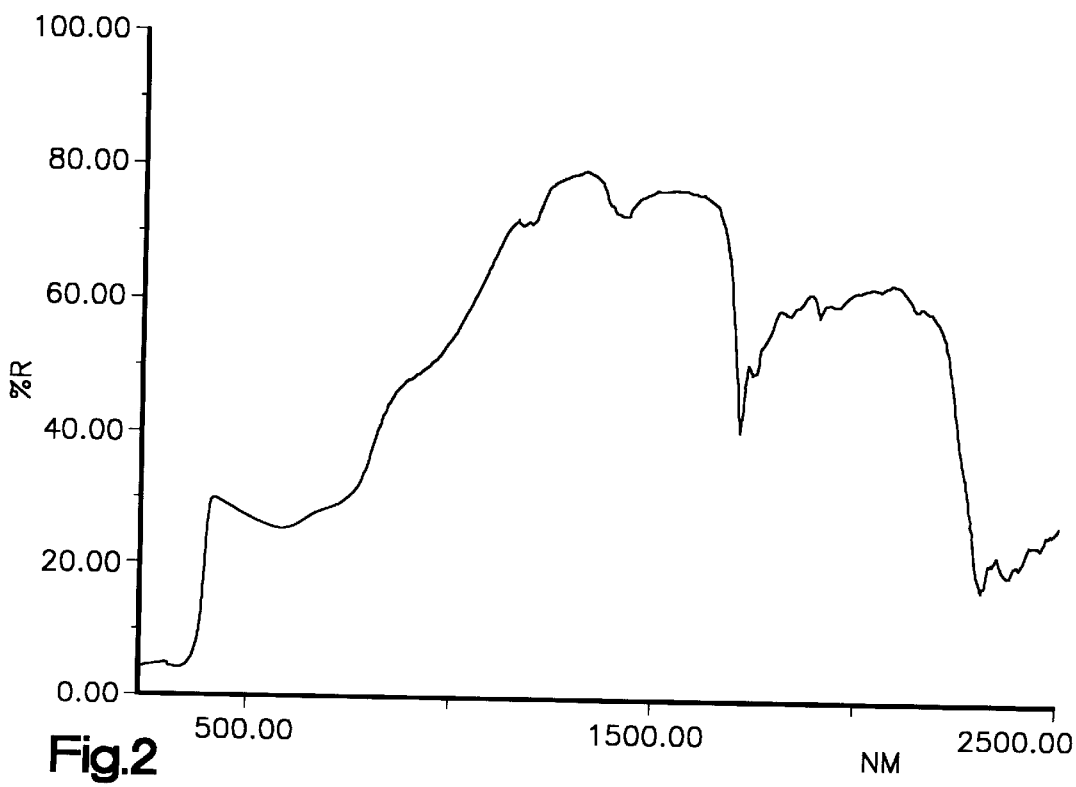
FIG. 2 shows an IR reflectance curve for a black pigment made in accordance with one aspect of the present invention.

The plots of the IR reflectance curves of two black pigments are shown in FIGS. 1 and 2, wherein % reflectance is reported on the y-axis and wavelength of light in nanometers is reported on the x-axis. The IR reflectance curve of the pigment according to the present invention shown in FIG. 2 has markedly higher % reflectance values at the same wavelengths compared to the IR reflectance curve of the conventional pigment shown in FIG. 1. Consequently, the pigment according to the present invention has better weather characteristics compared to the conventional pigment (PBK 30).

The L* values, ΔL* values with respect to PBK30, b* values, and Δb* values with respect to PBK30 of some of the examples and PBK 30 are reported in Table 1.

TABLE 1

| Pigment | L* | ΔL* | b* | Δb* |
| --- | --- | --- | --- | --- |
| Example 1 | 53.16 | −1.63 | −2.76 | −0.36 |
| Example 2 | 53.78 | −1.00 | −2.99 | −0.58 |
| Example 3 | 53.14 | −1.65 | −2.88 | −0.48 |
| Example 4 | 53.21 | −1.57 | −2.99 | −0.58 |
| Example 5 | 52.98 | −1.81 | −2.70 | −0.30 |
| Example 6 | 53.62 | −1.15 | −2.98 | −0.55 |
| PBK 30 | 54.79 | | −2.41 | |

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A blue shade black pigment composition, comprising:
   from about 40% to about 90% by weight of iron oxide;
   from about 10% to about 60% by weight of chromium oxide, the blue shade black pigment composition having a ratio of iron to chromium from about 1:1 to about 5:1 by weight; and from about 0.1% to about 20% by weight of manganese oxide, wherein the blue shade black pigment composition has an L* value of about 56 or less and a b* value of about −1 or less.

2. The blue shade black pigment composition according to claim 1 further comprising from about 0.01% to about 10% by weight of at least one mineralizer selected from the group consisting of metal fluorides, metal chlorides, and metal sulfates.

3. The blue shade black pigment composition according to claim 1 further comprising from about 0.01% to about 10% by weight of at least one inorganic material selected from the group consisting of titanium dioxide, silicon dioxide, boron oxide, and alkali metal salts.

4. The blue shade black pigment composition according to claim 1 further comprising from about 0.01% to about 2% by weight of at least one of a binder and a dispersant.

5. The blue shade black pigment composition according to claim 1, with the proviso that the composition does not comprise at least one of a binder and a dispersant.

6. The blue shade black pigment composition according to claim 1 comprising particles having an average size by volume from about 0.01 microns to about 3 microns.

7. The blue shade black pigment composition according to claim 1 further comprising from about 0.01% to about 10% by weight of at least one mineralizer selected from the group consisting of $BaF_2$, $SrF_2$, $CaF_2$, $MgF_2$, NaF, KCl, KF, $NH_4Cl$, $BaCl_2$, $SrCl_2$, $CaCl_2$, $MgCl_2$, NaCl, $BaSO_4$, $SrSO_4$, $CaSO_4$, $Na_2SO_4$, $MoO_3$, and $MgSO_4$.

8. The blue shade black pigment composition according to claim 1, wherein the composition has an L* value of about 55 or less and a b* value of about −2 or less.

9. A method of making a blue shade black pigment comprising:

combining from about 40% to about 90% by weight of iron oxide, from about 10% to about 60% by weight of chromium oxide, and from about 0.1% to about 20% by weight of manganese oxide to form a mixture;

heating the mixture to a temperature from about 700° C. to about 1,300° C. for a time from about 1 to about 5 hours; and optionally agitating the heated mixture to provide blue shade black pigment particles having an average size by volume from about 0.01 microns to about 3 microns.

10. The method according to claim 9, wherein the iron oxide comprises hydrated iron (III) oxide.

11. The method according to claim 9, wherein the manganese oxide comprises manganese dioxide.

12. The method according to claim 9, wherein the iron oxide, the chromium oxide and the manganese oxide individually have an average particle size of about 5 μm or less.

13. The method according to claim 9, wherein the mixture is heated to a temperature from about 800° C. to about 1,100° C. for a time from about 1.5 to about 4 hours.

14. The method according to claim 9, wherein iron oxide and chromium oxide are combined in a ratio from about 1.5:1 to about 4:1.

15. The method according to claim 9, wherein the blue shade black pigment particles have a crystal structure represented by $[Fe,Cr]_2O_3$.

16. The method according to claim 9, wherein the mixture is blended prior to heating.

17. The method according to claim 9, wherein agitating the heated mixture comprises pulverizing the heated mixture.

18. The method according to claim 9, wherein agitating the heated mixture comprises jet milling the heated mixture.

19. The method according to claim 9, wherein the blue shade black pigment particles have an average size by volume from about 0.25 microns to about 1 micron.

20. A blue shade black pigment composition prepared according to the method of claim 9.

21. A paint composition comprising a paint vehicle and the blue shade black pigment composition of claim 1.

22. An ink composition comprising an ink vehicle and the blue shade black pigment composition of claim 1.

23. A plastic composition comprising a plastic material and the blue shade black pigment composition of claim 1.

24. A plastic composition comprising:

a plastic material and a blue shade black pigment composition comprising
from about 40% to about 90% by weight of iron oxide;
from about 10% to about 60% by weight of chromium oxide, the blue shade black pigment composition having a ratio of iron to chromium from about 1.5:1 to about 4:1 by weight; and
from about 0.1% to about 20% by weight of manganese oxide, wherein the blue shade black pigment composition has an L* value of about 56 or less.

25. The plastic composition according to claim 24, wherein the plastic material comprises at least one selected from the group consisting of polystyrene, one or more polyolefins, one or more polyacrylic compounds, one or more polyvinyl compounds, one or more polyesters, cellulose ether, cellulose ester, polyamide, polycarbonate, polyurethane, and polyacrylonitrile.

* * * * *